(12) United States Patent
Horsch

(10) Patent No.: US 6,443,079 B1
(45) Date of Patent: Sep. 3, 2002

(54) AGRICULTURAL MACHINERY

(75) Inventor: Michael Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 0 days.

(21) Appl. No.: 09/553,788

(22) Filed: Apr. 21, 2000

(30) Foreign Application Priority Data

Oct. 23, 1997 (DE) .......................................... 197 46 927

(51) Int. Cl.[7] .............................................. A01B 59/04
(52) U.S. Cl. ............................ 111/52; 111/925; 111/24; 172/677; 280/444
(58) Field of Search ............................... 111/52, 53, 59, 111/18, 24, 925; 172/677, 681, 682, 776; 280/443, 444

(56) References Cited

U.S. PATENT DOCUMENTS

| | | | | |
|---|---|---|---|---|
| 4,036,305 A | * | 7/1977 | Kinzenbaw | 172/283 |
| 4,098,346 A | * | 7/1979 | Stanfill et al. | 172/283 |
| 4,171,825 A | * | 10/1979 | Woodell | 280/443 |
| 4,247,129 A | | 1/1981 | Whittaker | |
| 4,558,882 A | | 12/1985 | Fuss et al. | |
| 4,579,362 A | * | 4/1986 | Kirkpatrick | 280/444 |
| 4,720,119 A | * | 1/1988 | Ritter | 280/443 |
| 5,025,616 A | * | 6/1991 | Moss | 56/14.9 |
| 5,335,856 A | * | 8/1994 | Nathan | 239/164 |
| 5,351,635 A | * | 10/1994 | Hulicsko | 111/135 |
| 5,357,883 A | * | 10/1994 | Depault | 111/118 |
| 5,531,468 A | * | 7/1996 | White | 280/463 |
| 5,890,445 A | * | 4/1999 | Ridgley | 111/119 |

FOREIGN PATENT DOCUMENTS

| | | |
|---|---|---|
| DE | 195 31 172 | 3/1996 |
| FR | 2 034 151 | 12/1970 |
| FR | 2 274 209 | 1/1976 |
| FR | 2 399 197 | 3/1979 |

OTHER PUBLICATIONS pp. 240–241 of the book "Die Landmaschinenlehre", published by VEB Verlag Technik Berlin, second edition, vol. 1.
pp. 404–406 of the book "Die Landmaschinen und ihre Instandhaltung", published by Fachbuchverlag Dr. Pfanneberg & Co., Giessen, 1955.
pp. 1–8 of the promotional brochure "Niemeyer–GroBschwader", printed Oct. 1993.

* cited by examiner

*Primary Examiner*—Victor Batson
(74) *Attorney, Agent, or Firm*—Akerman Senterfitt

(57) ABSTRACT

An agricultural machine has a movable rack (10) having at least one main wheel (16, 18), a hitch (12) which is arranged on the rack (10), a reservoir container (14) which is carried by the rack (10) and/or the hitch (12), and an agricultural implement (20) which is attached to the rack (10) at the rear in the direction of travel and has a plurality of rear support wheels (28). The machine is developed to the effect that the at least one main wheel (16, 18) is positively steered as a function of the pulling direction of a traction force which is exerted on the hitch (12). Such a machine is particularly compact and maneuverable even when the reservoir container is large.

16 Claims, 3 Drawing Sheets

AGRICULTURAL MACHINERY

FIELD OF THE INVENTION

The invention relates to an agricultural machine as claimed in the preamble of claim 1. In particular, the invention relates to a machine for soil cultivation and/or treatment, for example a sowing machine.

BACKGROUND OF THE INVENTION

FR 23 99 197 presents an agricultural implement having the features of the preamble of claim 1.

DE 195 31 172 A1 discloses a sowing machine in which a triangular reservoir container is attached to a rack which forms an equilateral triangle. A pair of main wheels is arranged at each of the corners which bound the base of the rack. Each pair of main wheels can pivot about a vertical axis which has a minimum distance of approximately 40 cm from the horizontal axis of the pair of main wheels. As a result, the pairs of main wheels are dragged along in a way similar to a shopping trolley so that they follow the direction of movement of the sowing machine.

FR 20 34 151 presents an agricultural implement which can be used, for example for cultivating beet. The implement has a rack with pivotable rear wheels. The rear wheels are connected by means of Bowden cables to a hitch which is also pivotable, and are positively steered as a function of the angular position of the hitch. This arrangement is intended to ensure, when working on sloping ground transversely to the direction of the slope, that the agricultural implement is oriented in a line with a tractor.

However, the arrangement known from DE 195 31 172 A1 has the disadvantage that when cornering, the main wheels pivot out and trace an arc with a relatively large diameter, as is indicated in FIG. 1 of DE 195 31 172 A1 by a dashed line. For this reason, it is necessary to provide an appropriately large amount of free space for the main wheels by structural means. This is problematic in particular if a large and heavy reservoir container is to be used. In this case, appropriately large and wide main wheels have to be used in order to prevent the pressure on the soil from becoming too large. In addition, if the main wheels pivot out to a large extent, it is necessary to construct a machine which is, seen in its entirety, a very large and cumbersome machine which does not permit tight cornering.

SUMMARY OF THE INVENTION

Accordingly, the object of the invention is to avoid the aforesaid problems and to provide an agricultural machine which is as compact and maneuverable as possible, in particular even when the reservoir container is large.

This object is achieved according to the invention by means of a machine having the features of claim 1. The dependent claims relate to preferred developments of the invention.

The invention is based on the basic idea of positively steering the at least one main wheel of the machine in accordance with the direction of a traction force exerted on the machine. As a result, it is possible to arrange the steering axis of the main wheel in such a way that, for example, it passes centrally through the main wheel. A steering movement about this axis requires considerably less space than the arcuate pivoting movement in the case of the machine known from DE 195 31 172 A1. In addition, the positive steering has an overall improving effect on the driving characteristics of the machine when performing tight cornering.

In the machine according to the invention, the hitch is arranged on the rack. In particular, the hitch may be embodied as an integral part of the rack or may be rigidly connected to the rack. However, the hitch is preferably pivotably arranged on the rack. The pivot axis of the hitch preferably extends approximately vertically, with the result that the hitch becomes oriented in accordance with the direction in which the machine is being dragged. This arrangement is particularly advantageous because, when cornering, it causes the point of connection between the hitch and a tractor to migrate toward the inside of the bend. As a result, when performing a tight cornering maneuver the tractor is provided with additional free space: On the other hand, if a hitch were arranged rigidly there would be the risk of the rear wheel of the tractor which is on the inside of the bend striking against the reservoir container.

In preferred refinements of the embodiments with a moveable hitch, the pivoting movement of the hitch is used to positively steer the main wheel or main wheels. This provides the aforesaid advantages with very little effort in structural terms. Preferably, the pivoting movement of the hitch is converted by a suitable steering linkage into a steering movement of the travel wheel. The steering linkage can have a plurality of connecting elements, in particular tie rods and/or connecting rods or levers. In other embodiments, the steering movement is generated by the machine being coupled to the tractor at two points. The main wheel or wheels can, however, also be positively steered by means of an electric or hydraulic device.

There is preferably a dependence (not necessarily linear) between the pivot angle of the hitch and the steering angle of the main wheel or the steering angles (not necessarily identical) of the main wheels. The steering movement preferably takes place in the same direction as the pulling angle, or in particular by approximately the same angle as the pulling angle so that particularly good cornering properties are achieved.

The reservoir container preferably tapers toward the hitch and has a triangular or trapezoidal horizontal projection at least in certain sections, in order to provide as much space as possible for cornering maneuvers of the tractor. In particular with reservoir containers which are relatively large and are thus heavy in the loaded state, the at least one main wheel is preferably provided with a wide tire in order to minimize the pressure on the soil. The tire preferably has a width of more than 50% or more than 60% of its diameter. The tire may be, for example, 0.5 m to 1.2 m (in particular 0.8 m) wide and/or measure 0.7 m to 2.0 m (in particular 1.35 m) in diameter. With such large tire dimensions, the inventive measure of positive steering is particularly important in order to prevent the wide tire or tires moving out too far.

In further preferred embodiments, at least two main wheels are provided, and the rack and/or the hitch are/is at least partially arranged between said main wheels. If the rack is relatively narrow and preferably does not protrude laterally beyond the reservoir container, the freedom of movement for cornering maneuvers of the tractor can thus be increased further. In this case it is also important that there is sufficient space between the main wheels in order to be able to guide a sufficiently flexurally rigid rack and/or a sufficiently flexurally rigid hitch between them.

In preferred embodiments, the machine has an agricultural implement which may be embodied as a soil cultivating and/or soil treatment implement and can have a plurality of support wheels. For example, the machine may be a sowing machine, the reservoir container may be a container for the seed, and the agricultural implement may have a sowing implement and an implement connected behind it, for example a curry comb or a heavy cultivator. For other applications, the reservoir container may be, for example, a liquid container or container for material which is to be spread.

BRIEF DESCRIPTION OF THE DRAWINGS

An exemplary embodiment of the invention and a plurality of alternative embodiments will now be described in more detail with reference to the schematic drawings, in which.

DETAILED DESCRIPTION OF THE EMBODIMENTS OF THE INVENTION

Figure 1:
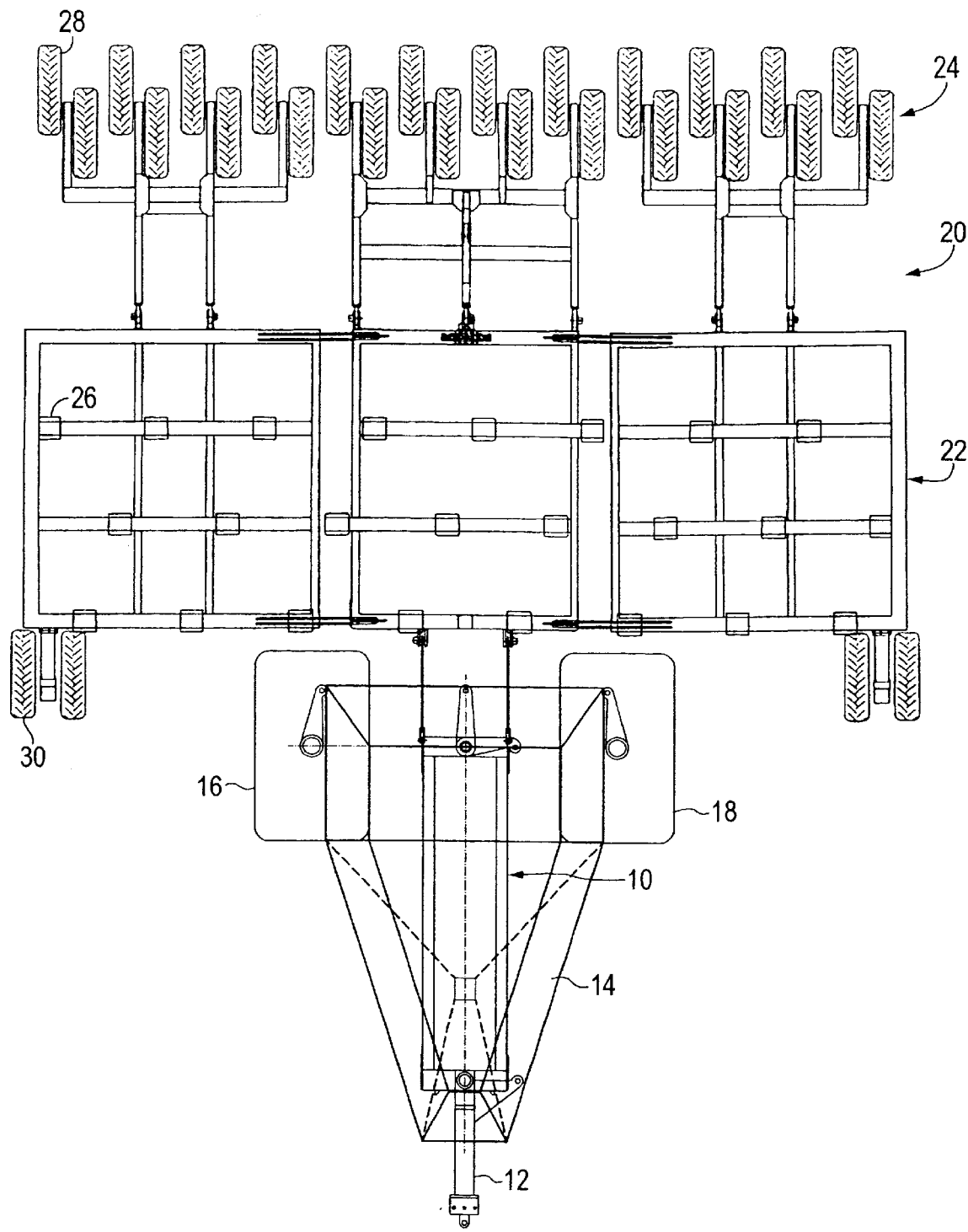
FIG. 1 shows a plan view of the machine.

The agricultural machine which is illustrated in FIG. 1 is a tractor-pulled sowing machine for a large range of work. A rack 10 is embodied as an essentially rectangular hollow sectional frame with a length of approximately 2.5 m and a width of approximately 0.6 m. A hitch 12 is pivotably attached to the narrow side, at the front in the dragging direction, of the rack 10. The hitch 12 is embodied as a short hitch with a length of approximately 1.0 m and it is used to couple a tractor (not shown).

In the exemplary embodiment described here, a reservoir container 14 for seed is detachably and exchangeably attached to the rack 10. The reservoir container 14 tapers toward the hitch 12 so that the rear wheels of the tractor themselves do not strike against the side walls of the reservoir container 14 during tight cornering maneuvers. To be more precise, the section of the reservoir container 14 which faces the hitch 12 has a trapezoidal horizontal projection, while the section of the reservoir container 14 which faces away from the hitch 12 has a rectangular horizontal projection.

Two main wheels 16, 18 are each provided with a wide tire with a width of 0.8 m and a diameter of 1.35 m. The main wheels 16, 18 are steerably connected to the rack 10, as will be explained later in more detail. A rear section of the rack 10, including its rear narrow side, is located between the two main wheels 16, 18 and is at a sufficient distance from them to ensure that the main wheels 16, 18 are not impeded at any permissible steering angle.

The rack 10 is detachably connected at its rear narrow side to an agricultural implement 20 by means of two connecting elements. The agricultural implement 20 has, in the exemplary embodiment shown here a, sowing implement 22 behind which an implement 24 which is embodied as a curry comb is connected. The sowing implement 22 has a plurality of sowing units (one of which is designated by 26 in FIG. 1). Each sowing unit 26 is assigned a rear support wheel (designated by 28 in FIG. 1 by way of example) of the curry comb. The rear support wheels 28 form approximately a row, although they are offset somewhat in pairs, through the center of which row the vertical pivot axis of the entire machine runs when cornering. In addition, the sowing implement 22 has a plurality of front support wheels (designated by 30 in FIG. 1 by way of example).

Figure 2:
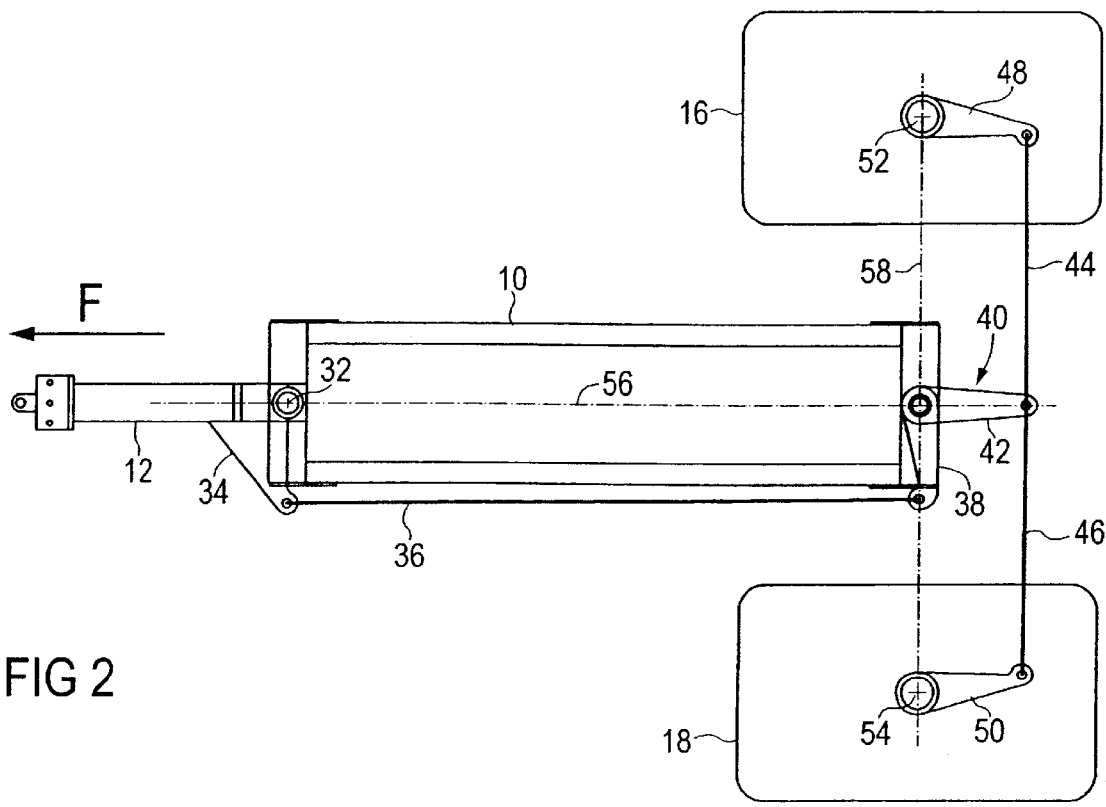
FIG. 2 shows a plan view of the rack, the hitch and the main wheels of the machine.
Figure 4:
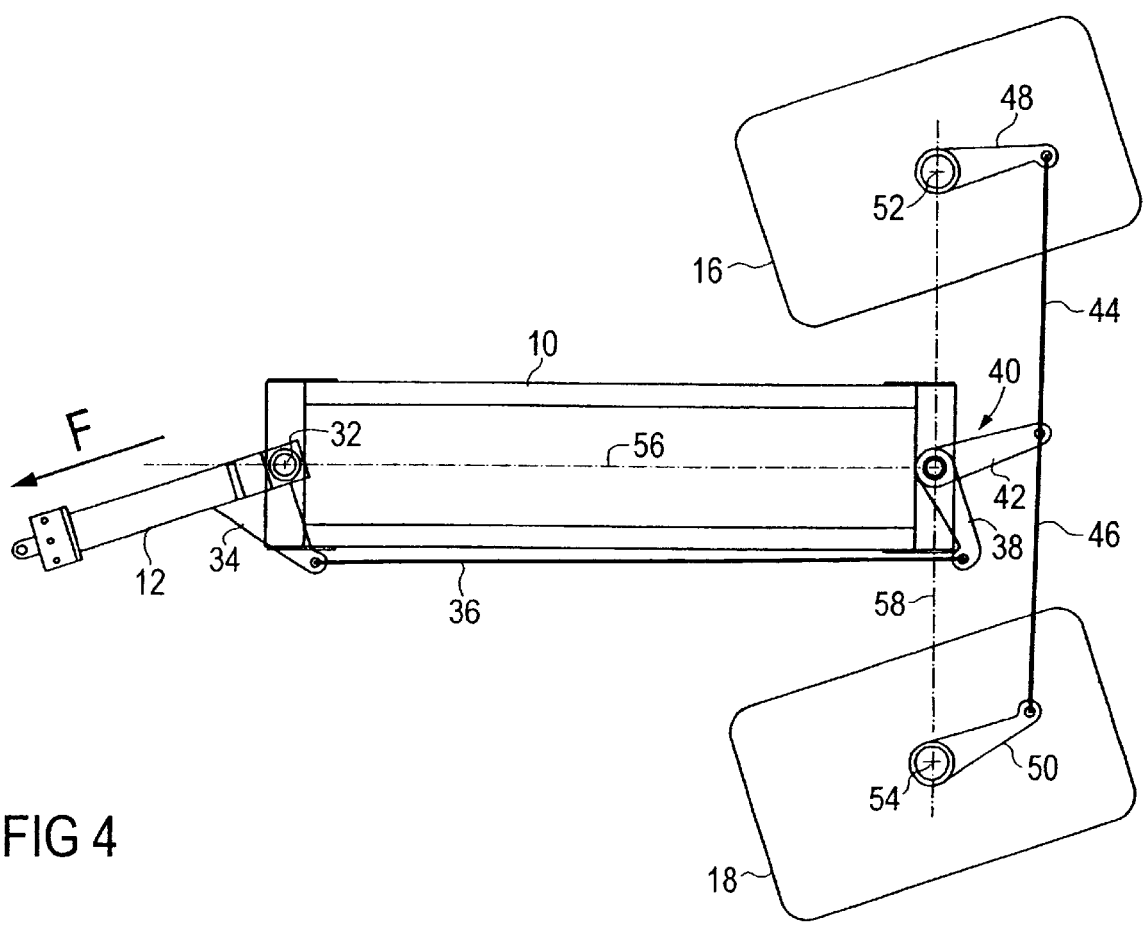
FIG. 4 shows a view as in FIG. 2 while the machine is cornering.

As is shown more precisely in FIG. 2 and FIG. 4, the hitch 12 can pivot about an axis 32 which is perpendicular to the plane of the drawing. The hitch 12 has a lever projection 34 which is connected to a first lever arm 38 of a two-armed intermediate lever 40 by means of a steering rod 36. The second lever arm 42 of the intermediate lever 40 is connected via two track rods 44, 46 to one steering lever 48, 50 in each case. The main wheels 16, 18 can be steered by means of the steering levers 48, 50. To be more precise, the main wheels 16, 18 can be pivoted by pivoting the steering levers 48, 50 about, in each case, one steering axis 52, 54 which is perpendicular to the plane of the drawing.

In addition, FIG. 2 and FIG. 4 show a longitudinal axis 56 of the rack 10 and a transverse axis 58 as dot-dashed lines. The transverse axis 58 corresponds to the course of an axle structure (not shown) by means of which the two main wheels 16, 18 are connected to the rack 10. The transverse axis 58 intersects the steering axes 52, 54 approximately in the center of the main wheels 16, 18 in each case.

FIG. 2 represents a situation in which the agricultural machine is pulled by the tractor in the straight-ahead direction. The traction force F which is exerted on the hitch 12 runs therefore in a line with the longitudinal axis 56. The steering linkage which is formed from the components 34, 36, 38, 40, 42, 44, 46, 48 and 50 is configured in such a way that in this case the direction of travel of the two main wheels 16, 18 also lies approximately in the direction of the longitudinal axis 56.

In the situation shown in FIG. 4, the tractor runs through a left-hand bend. The traction force F which is exerted on the hitch 12 deviates from the direction of the longitudinal axis 56 by an angle of approximately 20. The hitch 12 is correspondingly pivoted by approximately this angle in the anticlockwise direction. The main wheels 16, 18 are also pivoted in the same direction and by approximately the same angle by means of the steering rod 36, the intermediate lever 40 and the track rods 44, 46. The steering angle thus follows the pulling angle of the traction force F or, in the exemplary embodiment described here, the pivot angle of the hitch 12.

From FIG. 4 it is also clear that the coupling point of the hitch 12 to the tractor is at a distance from the longitudinal axis 56. The tractor thus gains more freedom of movement in order to travel through very tight cornering radii without a rear wheel of the tractor striking against the reservoir container 14. In an extreme case, the tractor can be almost at right angles to the longitudinal axis 56, the maximum pivot angle of the hitch 12 being limited by suitable stops.

In alternative embodiments of the agricultural machine, the rack 10 and the hitch 12 have different dimensions. For example, the hitch 12 may be embodied to be longer and may be pivotably connected to the rack 10 only approximately at the transverse axis 58. The rack 10 then does not need to extend as far as the tractor and can be reduced to the axle structure for the two main wheels 16, 18. In further alternative embodiments, the hitch 12 may be rigidly connected to the rack 10.

In addition, in alternative embodiments, the steering rod 36 is not coupled to the lever projection 34 of the hitch 12 but instead extends as far as the tractor. Two coupling points, which are arranged at a distance from one another, are then provided on the tractor for the hitch 12 or the lengthened steering rod 36. The section of the tractor between these two coupling points assumes the function of the lever projection 34 in that the steering rod 36 is displaced relative to the hitch 12, in the longitudinal direction, when the tractor is cornering. These alternative embodiments are suitable in particular for use with a hitch 12 which is rigid or which can pivot about a center of rotation which is relatively far from the tractor.

Figure 3:
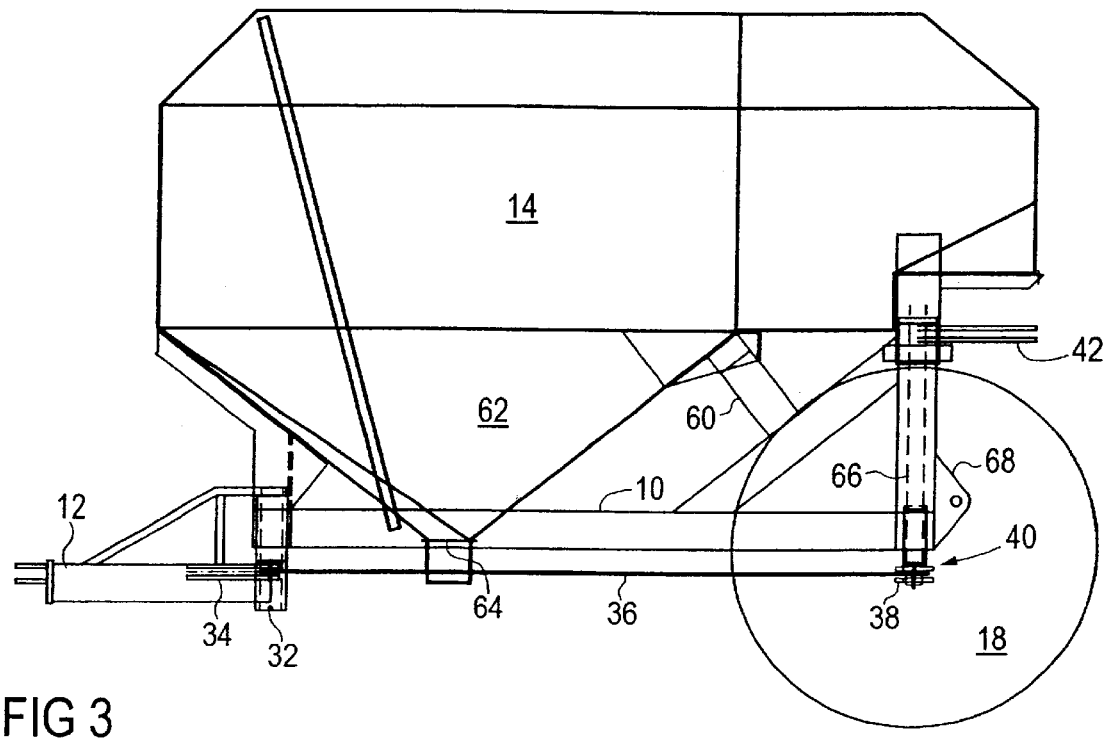
FIG. 3 shows a side view of the components of the machine which are shown in FIG. 2 and of the reservoir container.

The illustration in FIG. 3 also shows the refinement of the reservoir container 14 which is supported on a carrier 60 of the rack 10. A section 62 of the reservoir container 14 which tapers in the form of a funnel opens into an outlet 64 to which, for example, a metering device for seed is connected. In addition, FIG. 3 shows the design of the intermediate lever 40 in which the two lever arms 38, 42 are arranged at different heights and are connected to one another by means of a tube 66. The tube 66 is itself rotatably mounted in a vertical section of the rack 10. As a result of this design, both the steering rod 3 6 and the two track rods 44, 46 extend approximately horizontally. Finally, FIG. 3 illustrates an attachment flange 68 for coupling the agricultural implement 20.

I claim:

1. An agricultural machine, comprising:
   a rack having at least one steered wheel;
   a hitch in front of the rack;
   a reservoir container mounted on top of the rack;
   an agricultural implement removably attached to a rear of the rack in the direction of travel; and
   a plurality of rear support wheels at the rear of the agricultural implement;
   wherein the at least one steered wheel is arranged at a rear portion of the rack and is steered based upon a pulling direction of a traction force exerted on the hitch.

2. The machine of claim 1, wherein the hitch is attached to the rack so as to be capable of pivoting about a vertical axis.

3. The machine of claim 2, wherein a pivot angle of the hitch determines a steering angle of the at least one steered wheel.

4. The machine of claim 3, wherein a steering linkage is provided in order to transmit a pivoting movement of the hitch to the at least one steered wheel.

5. The machine of claim 1, wherein the reservoir container tapers toward the hitch.

6. The machine of claim 1, wherein the at least one steered wheel has a wide tire.

7. The machine of claim 1, wherein a tire of the at least one steered wheel has a width of 0.5 m to 1.2 m.

8. The machine of claim 1, wherein the rack is arranged at least partially between at least two steered wheels.

9. The machine of claim 1, wherein the agricultural implement has a showing implement and an implement which is connected to the agricultural implement at the rear of the machine.

10. The machine of claim 1, wherein the machine is a sowing machine.

11. The machine of claim 5, wherein the reservoir container has a horizontal projection which is triangular in certain sections.

12. The machine of claim 1, wherein the agricultural implement is attached to the rack in a way such that a relative sideways movement between the agricultural implement and the rack is substantially prevented.

13. The machine of claim 1, wherein the agricultural implement is attached to the rack in a way such that a relative up and down movement between the agricultural implement and the rack is substantially allowed.

14. The machine of claim 1, wherein a tire of the at least one steered wheel has a diameter of 0.7 m to 2.0 m.

15. The machine of claim 1, wherein the hitch is arranged at least partially between at least two steered wheels.

16. The machine of claim 5, wherein the reservoir container has a horizontal projection which is trapezoidal in certain sections.

* * * * *

UNITED STATES PATENT AND TRADEMARK OFFICE
CERTIFICATE OF CORRECTION

PATENT NO. : 6,443,079 B1
DATED : September 3, 2002
INVENTOR(S) : Michael Horsch It is certified that error appears in the above-identified patent and that said Letters Patent is hereby corrected as shown below:

Title page,
Item [30], Foreign Application Priority Data, please add
-- October 21, 1998   (WO) .......PCT/EP98/06672 --.

Signed and Sealed this

Seventh Day of January, 2003

JAMES E. ROGAN
*Director of the United States Patent and Trademark Office*